United States Patent [19]

Van Der Walt

[11] Patent Number: 4,929,897

[45] Date of Patent: May 29, 1990

[54] METHOD AND APPARATUS FOR DETECTING CROSS SECTIONAL AREA VARIATIONS IN A ELONGATE OBJECT BY MEASURING RADIAL MAGNETIC FLUX VARIATIONS USING SPACED-APART COILS

[75] Inventor: Nicholaas T. Van Der Walt, Kibler Heights, South Africa

[73] Assignee: Crucible Societe Anonyme

[21] Appl. No.: 273,268

[22] Filed: Nov. 18, 1988

[30] Foreign Application Priority Data

Nov. 23, 1987 [ZA] South Africa ............... 87/8753

[51] Int. Cl.$^5$ .................. G01N 27/82; G01N 27/72; G01R 33/12

[52] U.S. Cl. .................... 324/240; 324/232; 324/235

[58] Field of Search ......... 324/224, 225, 232, 234–243

[56] References Cited

U.S. PATENT DOCUMENTS

| | | |
|---|---|---|
| 1,992,100 | 2/1935 | Stein . |
| 2,049,924 | 8/1936 | Pugh ................... 324/224 |
| 2,065,119 | 12/1936 | Davis, Jr. . |
| 2,124,579 | 7/1938 | Knerr et al. . |
| 2,389,513 | 6/1959 | Callan et al. . |
| 2,895,103 | 7/1959 | Vogt et al. . |
| 3,242,425 | 3/1956 | Harmon . |
| 3,273,055 | 9/1966 | Quittner . |
| 3,424,976 | 1/1969 | Jezewski et al. . |
| 3,694,740 | 9/1972 | Bergstrand . |
| 3,881,151 | 4/1975 | Bigelow, Jr. . |
| 3,887,865 | 6/1975 | Brooks . |
| 4,002,967 | 1/1977 | Fennell . |
| 4,399,422 | 8/1983 | Nelson et al. . |
| 4,427,940 | 1/1984 | Hirama et al. . |
| 4,439,731 | 3/1984 | Harrison . |
| 4,495,465 | 1/1985 | Tomaiuolo et al. . |
| 4,546,316 | 10/1985 | Lang ..................... 324/262 |
| 4,659,991 | 4/1987 | Weischedel ............... 324/241 |

FOREIGN PATENT DOCUMENTS

| | | | |
|---|---|---|---|
| 0239537 | 9/1987 | European Pat. Off. ........... 324/232 |
| 0148597 | 11/1979 | Japan ....................... 324/241 |
| 936033 | 1/1951 | United Kingdom . |
| 1270748 | 9/1970 | United Kingdom . |
| 1542933 | 5/1976 | United Kingdom . |
| 2012966 | 12/1978 | United Kingdom . |
| 2071331 | 7/1980 | United Kingdom . |
| 2100440 | 6/1981 | United Kingdom . |
| 2115558 | 7/1981 | United Kingdom . |
| 0127443 | 5/1984 | United Kingdom . |
| 2206969 | 6/1988 | United Kingdom . |

OTHER PUBLICATIONS

Herbert R. Weischedel, The Inspection of Wire Ropes in Service: A Critical Review, Reprinted from Materials Evaluation, vol. 43, No. 13, pp. 1592–1605, 1985, American Society for Nondestructive Testing, Inc.

Primary Examiner—Reinhard J. Eisenzopf
Assistant Examiner—Walter E. Snow

[57] ABSTRACT

A method and apparatus is provided for electromagnetically testing an elongate object such as a wire rope for cross-sectional area variations. The elongate object is magnetized over adjacent sections in opposing directions along a longitudinal axis of the elongate object. Variations in axial magnetic flux, which have been observed to be coincident with variations in the cross-sectional area of an elongate object, are measured by using saddle coils which are positioned adjacent the magnetized sections of the elongate object and which detect variations in radial flux. The saddle coils are positioned to have first half circumferential windings located where the magnetic flux density in the elongate object is at a maximum value and second half circumferential windings located where the magnetic flux density in the object is zero.

9 Claims, 5 Drawing Sheets

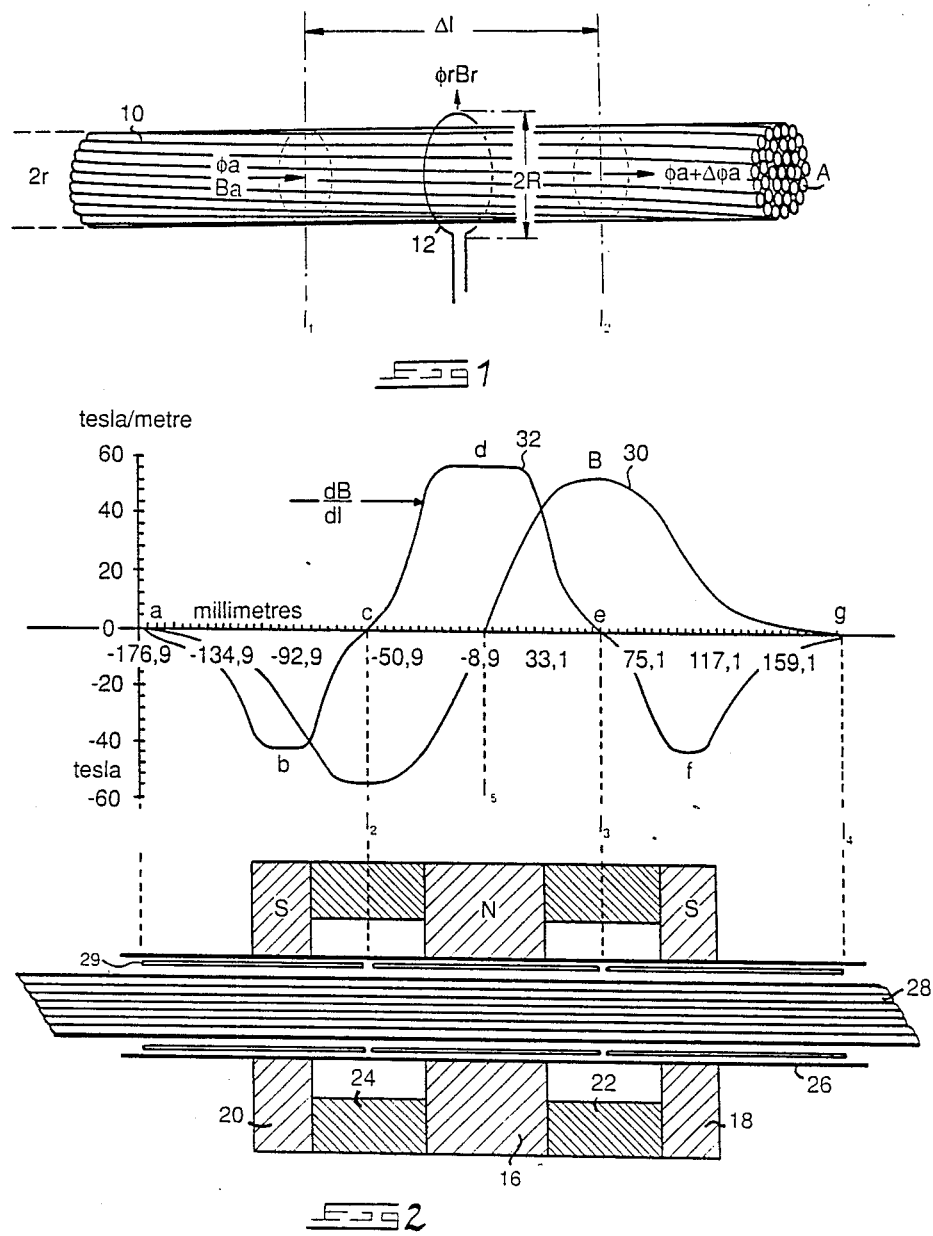

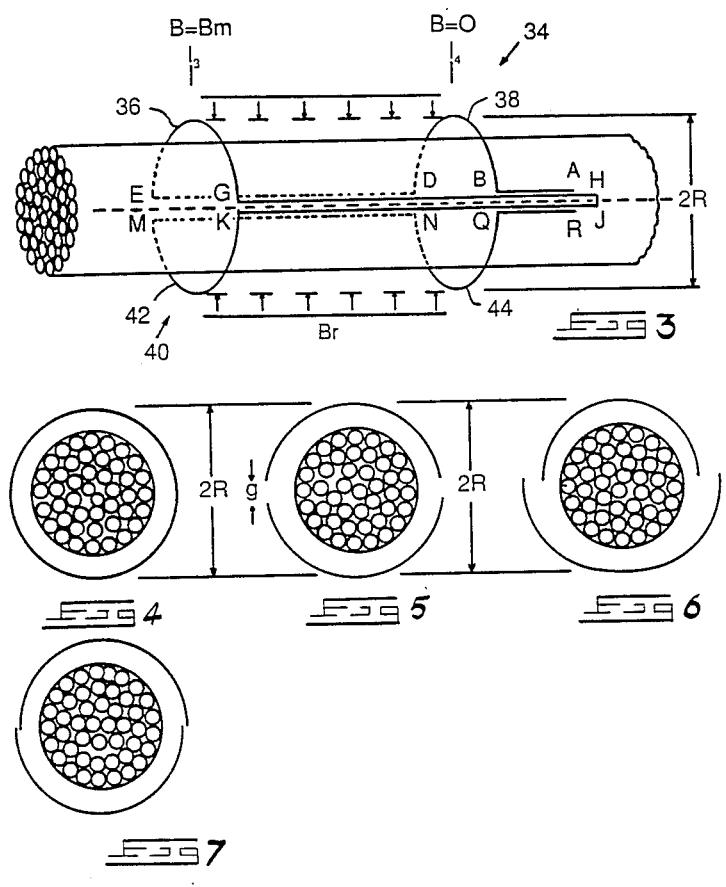
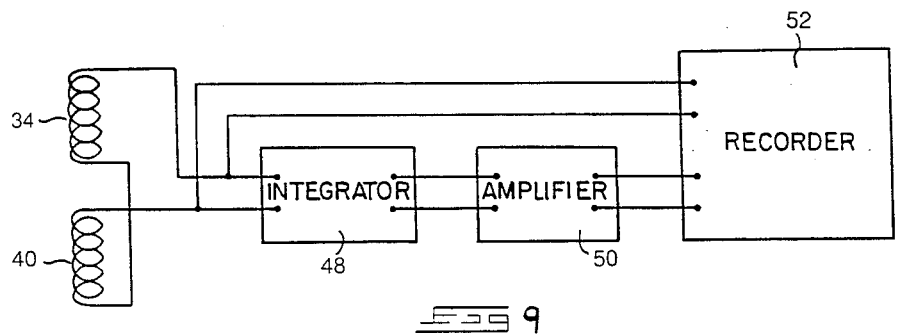

METHOD AND APPARATUS FOR DETECTING CROSS SECTIONAL AREA VARIATIONS IN A ELONGATE OBJECT BY MEASURING RADIAL MAGNETIC FLUX VARIATIONS USING SPACED-APART COILS

BACKGROUND OF THE INVENTION

This invention relates generally to the electromagnetic testing of elongate objects such as wire ropes and is concerned in particular with the detection of cross sectional area variations in a wire rope.

Steel hoist ropes are used in many applications for conveying personnel or material. Such ropes must be examined regularly to ensure that operational standards are consistently being maintained and to detect deterioration in the ropes before safety problems can arise.

Defects in a wire rope can be placed in one of three categories namely cross sectional area variations, changes in the wire contact pattern of a rope which is made up from strands of wires wound in a particular pattern, and broken wires.

The invention is concerned primarily with the first mentioned characteristic namely cross sectional area variations in a rope. The strength of a wire rope is dependent on its cross sectional steel area and this can for example be reduced by normal wear and tear, corrosion, and stretch necking of a weak part.

SUMMARY OF THE INVENTION

The invention provides a method of detecting cross sectional area variations in an elongate object which includes the steps of axially magnetizing the object and of detecting variations in the magnetic flux in the object which are attributable to cross sectional area variations.

The axial magnetic flux variations may be detected by measuring variations in the radial magnetic flux emanating from, or passing to, the object.

It will be shown, hereinafter, that radial magnetic flux density is proportional to axial magnetic flux density gradient.

Variations in the radial magnetic flux may be measured by using saddle coils.

The invention also extends to apparatus for detecting cross sectional area variations in an elongate object which includes a magnetizing head for establishing a first magnetic field and at least a second magnetic field which is adjacent the first magnetic field, the two magnetic fields being directed respectively in opposing senses, a pathway being formed for the object which permits the object to travel in an axial direction through the first magnetic field and through the second magnetic field whereby the object is magnetized in opposing axial directions by the first and second magnetic fields respectively, at least two saddle coils positioned opposite one another on opposing sides of the pathway, each saddle coil having at least first and second half circumferential windings which are positioned axially spaced from one another, and means for detecting a voltage which is induced in the saddle coils which is attributable to a cross sectional area variation in the object.

In one embodiment of the invention opposed half circumferential windings of the respective saddle coils are positioned at a location where the magnetic flux density in the object is at a maximum value and the other half circumferential windings are positioned at a location where the magnetic flux density in the object is zero. In an alternative embodiment the two opposed pairs of half circumferential windings are positioned at locations where the magnetic flux density in the object is at a maximum value in one sense, and at a minimum value in an opposing sense, respectively.

The saddle coils are connected to one another so as to eliminate or reduce noise or any other factors which are common to both coils and so that the net voltage induced in the two saddle coils, which is attributable substantially only to cross sectional variations in the object, may be detected.

Each saddle coil may include a plurality of turns.

The voltage induced in the saddle coils may be integrated with respect to time or axial distance, to obtain a measure of cross sectional area variations.

Speed variations may be compensated for.

In an alternative embodiment the saddle coils are connected across a bridge which is adjustable so as to compensate further for noise or, otherwise put, to balance the coils more precisely. The bridge may take the form of a resistance with a variable tap.

As has been printed out the invention finds particular application in the testing of a wire rope.

BRIEF DESCRIPTION OF THE DRAWINGS

The invention is further described by way of example with reference to the accompanying drawings in which:

FIG. 1 illustrates portion of a steel cylinder, which for example consists of a length of wire rope, which is magnetized, FIG. 2 illustrates in cross section and from the side a magnetizing head which is used for magnetizing a wire rope and, adjacent the magnetizing head, graphs depicting the variation of magnetic flux density, and of the rate of change of magnetic flux density relatively to the length of the magnetizing head, FIG. 3 illustrates a portion of a steel cylinder which has matched saddle coils positioned adjacent it, FIGS. 4 to 7 respectively are end views of different arrangements of the pair of saddle coils around the steel cylinder, FIG. 9 is a block diagram of a circuit used to monitor an output signal produced by the saddle coil pair shown in FIG. 3, FIGS. 10 and 11 show waveforms produced in the circuit of FIG. 9, FIGS. 12 and 13 are waveforms produced in a variation of the invention.

DESCRIPTION OF PREFERRED EMBODIMENT

Figure 8:
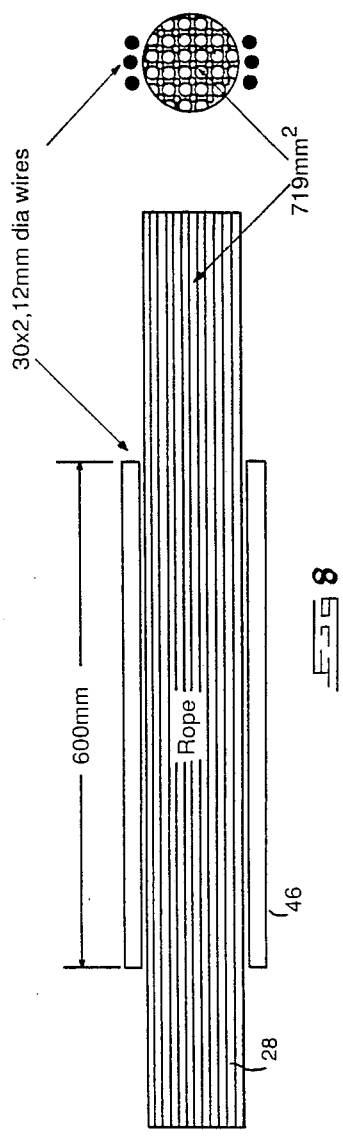
FIG. 8 shows, in a side view and an end view, a rope under test.

The principles of the invention are described hereinafter firstly by examining the theoretical basis of the invention and thereafter by considering one example of a practical implementation of the theoretical principles.

THEORETICAL CONSIDERATIONS

FIG. 1 illustrates a portion of a steel cylinder 10 which in this example is a length of wire rope of radius r and of cross sectional area A. A coil 12 of radius R is positioned around an element of the wire rope of length $\Delta l$.

Assume that the wire rope is magnetized axially and that the axial magnetic flux density is $B_a$. The axial flux at the left hand side of the element is $\phi_a$ while at the right hand side of the element the flex is $\phi_a + \phi_a$.

Over the length $\Delta l$ of the element the radial flux density is $B_r$ and the radial flux is $\phi_r$.

The relationship between the axial flux and the axial flux density can be expressed as follows:

$$\phi_a = B_a A \qquad (1)$$

The total axial flux which is included by the coil 12 is $\phi_t$ and is given by the expression:

$$\phi_t = \phi_a + \phi_s \qquad (2)$$

where $\phi_s$ is the intrinsic flux in the total area of the coil.

Equation (2) can be rewritten as:

$$\phi_t = B_a A + B_s \pi R^2 \qquad (3)$$

where $B_s$ is the flux density in space and is given by the expression:

$$B_s = \frac{\mu_o}{\mu} B_a \qquad (4)$$

$\mu_o$ is the intrinsic permeability of free space and $\mu$ is the intrinsic permeability of the wire rope element at the flux density $B_a$.

By combining equation (3) with equation (4), equation (3) can be rewritten:

$$\phi_t = B_a A + \frac{\mu_o}{\mu} B_a \pi R^2 \qquad (5)$$

If equation (5) is differentiated with respect to A, in order to determine the relationship between the total flux through the coil 12 and a variation in the cross sectional area of the rope 10, one arrives at the following equation:

$$\frac{d\phi_t}{dA} = B_a \qquad (6)$$

Equation (6) means that if there is a variation in the cross sectional area of the wire rope element under consideration equal to $\Delta A$, there is a resulting variation of the axial flux in the element $\Delta \phi_a$, which is the same as the variation in the flux through the coil 12, which is $\Delta \phi_t$ and which is given by the expression:

$$\Delta \phi_t = B_a \Delta A \qquad (7)$$

From equation (7) one can deduce that for a wire rope element which is axially magnetized, and at any flux density, variations in the cross sectional area of the wire rope element can be measured by measuring variations in the total axial magnetic flux in the wire rope element.

FIG. 1 depicts a situation wherein the axial flux in the wire rope element 10 varies by an amount $\Delta \phi_a$ over the length $\Delta l$. The flux law of Gauss states that lines of flux are continuous and have no origin. Consequently a variation of axial flux, as shown in FIG. 1, must be accompanied by a variation of the radial flux $\phi_r$ over the length $\Delta l$.

Assume that $\Delta l$ is small enough for the radial flux density $B_r$ at the radius R of the coil 12 to be considered constant. One may then express the resulting relationship as:

$$\Delta \phi_a = A_c B_r \qquad (8)$$

where $A_c$ is the area of the wall of a cylinder of radius R and of length $\Delta l$ and is given by the expression:

$$A_c = 2\pi R \Delta l \qquad (9)$$

Through the use of equation (9), equation (8) can be rewritten as:

$$\Delta \phi_a = \Delta(A_c B_r) = 2\pi R \Delta l \, B_r \qquad (10)$$

If the area over which the flux difference $\Delta \phi_a$ takes place is constant then $\Delta \phi_a = \Delta(B_a A) = \Delta B_a A$.

Equation (10) can then be rewritten as:

$$B_r = \frac{\Delta B_a \, A}{\Delta l \, 2\pi R} \qquad (11)$$

If $\Delta l \rightarrow 0$ then equation (11) can be expressed in the following form:

$$\frac{dB_a}{dl} = \frac{2\pi R}{A} B_r(l) \qquad (12)$$

Equation (12) gives the relationship between the axial flux density and the radial flux density as a function of the length l of the wire rope element 10.

Integration of equation (12) over a length of the wire rope element between locations $l_1$ and $l_2$ gives the following relationship:

$$B_a(l_2) - B_a(l_1) = \frac{2\pi R}{A} \int_{l_1}^{l_2} B_r(l) \, dl \qquad (13)$$

which can be expressed as:

$$\phi_a(l_2) - \phi_a(l_1) = \Delta \phi_a = \Delta \phi_t = 2\pi R \int_{l_1}^{l_2} B_r(l) \, dl \qquad (14)$$

The interpretation to be placed on equation (14) is that a variation in the axial flux between any two points along the length of a magnetized cylinder is equal to the change in the radial flux which penetrates the cylinder between these two points. This relationship is true not only for a radial surface which has a constant radius R but for any surface, whatever its circumferential shape, provided that $B_r$ is defined as being normal to the circumferential surface along its entire circumferential length.

Equation (7) shows that the change in the flux through the coil 12 is dependent upon any area variation of the wire rope element 10 and equation (14) shows that the flux change can be measured by a process involving integration of the radial flux density. These two equations can be combined to give the following relationship:

$$\Delta A = \frac{2\pi R}{B_a} \int_{l_1}^{l_2} B_r(l) \, dl \qquad (15)$$

AN EXAMPLE OF THE INVENTION BASED ON THE AFOREMENTIONED THEORETICAL CONSIDERATIONS

FIG. 2 illustrates from the side and in cross section a magnetising head 14 of the kind disclosed in South African Patent No. 87/1964. This head includes a central north pole 16 and two outer south poles 18 and 20 respectively. Permanent magnet stacks 22 and 24 are positioned on formers respectively between the opposing faces of the pole pairs.

The magnetic stacks and the pole pieces are circumferentially positioned on a former 26 which provides an axial path through the magnetizing head for a rope 28 which is to be tested.

Above the drawing of the magnetizing head 14 is a graph 30 which illustrates the variation of the flux density B in the wire rope 28, and a graph 32 which depicts the variation of the flux density gradient in the rope, both as a function of the axial position within the head. At locations $l_1$, $l_2$, $l_3$ and $l_4$, the curve 32 has zero values. The curve 30 has zero value at a location $l_5$ which corresponds approximately to the central position of the north pole, and at the locations $l_1$ and $l_4$. Maximum flux density values occur, in the negative sense, at $l_2$ and, in the positive sense, at $l_3$.

Various critical points on the curves 30 and 32 are marked with the reference letters a to g.

Using equation (14) and integrating, in each case, between the locations $l_1$ and $l_2$, $l_2$ and $l_3$, and $l_3$ and $l_4$, gives the following expressions:

$$-B_m A = -2\pi R \int_{l_1}^{l_2} B_r(l) \, dl$$

$$= -2\pi R \text{ (area under curve } abc\text{)} \quad (16)$$

$$-B_m A - B_m A = -2\pi R \int_{l_3}^{l_2} B_r(l) \, dl$$

$$= -2\pi R \text{ (area under curve } cde\text{)} \quad (17)$$

$$B_m A = 2\pi R \int_{l_4}^{l_3} B_r(l) \, dl$$

$$= 2\pi R \text{ (area under curve } efg\text{)} \quad (18)$$

Equation (18), for example, is an expression of the net radial flux which enters the circumferential surface of the rope between the locations $l_3$ and $l_4$.

FIG. 3 depicts a saddle coil 34 which has first and second half circumferential windings 36 and 38 respectively, and a saddle coil 40 which has half circumferential windings 42 and 44 respectively. The half circumferential windings 36 and 42 are positioned at axially coincident locations, but on opposing sides of the rope, in slots formed in the former 26 at the location $l_3$, while the half circumferential windings 38 and 44 are similarly positioned in slots formed in the former at the location $l_4$ of the magnetizing head 14. As has been noted at these locations the corresponding flux densities are $B_m$ and O. Points A to H and J to N, P, Q and R, are marked on the windings.

If the radial flux density $B_r$ is constant around the circumference of the cylinder which is coincident with the surfaces of the coil and of radius R, and is a function of axial length 1 only, then the total radial flux which passes through the upper saddle coil 34 is:

$$\phi_{34} = (\text{length } BCD) \int_{l_4}^{l_3} B_r(l) \, dl \quad (19)$$

If the rope 28 moves axially past this coil with a velocity $v$, a voltage $V_{AH}$ induced between the terminals A and H is:

$$V_{AH}(t) = -N \frac{d\phi_{34}}{dt} \quad (20)$$

where N is the number of turns in the winding 34. Equation 20 can be rewritten:

$$V_{AH}(t) = -N \frac{dl}{dt} \frac{d}{dl} \phi_{34} \quad (21)$$

The rope velocity $v$ is given by the expression:

$$v = \frac{dl}{dt}$$

and substituting this expression, and equation (19), in equation (21) gives the induced voltage as a function of rope length as:

$$V_{AH}(l) = -Nv \frac{d}{dl} \phi_{34} = -Nv(\text{length } BCD) \frac{d}{dl} \int_{l_3}^{l_4} B_r(l) dl \quad (23)$$

By means of a similar analysis the voltage $V_{JR}$ induced in the lower saddle coil 40 is given by the expression:

$$V_{JR}(l) = -Nv(\text{length } NPQ) \frac{d}{dl} \int_{l_3}^{l_4} B_r(l) dl \quad (24)$$

FIG. 3 shows H and J connected to one another. The voltage which then appears across the terminals A and R is additive and is given by the expression:

$$V_{AR}(l) = -Nv(\text{length } BCD + \text{length } NPQ) \frac{d}{dl} \int_{l_3}^{l_4} B_r(l) dl \quad (25)$$

FIG. 4 shows from an end, i.e. in cross section, and ideal situation wherein the length DE is coincidential in space with the length NM, and length GH is coincidental in space with the length KJ. In this ideal case the expression:

(length $BCD$+length $NPQ$)=$2\pi R$

Using this expression, and equation (18), equation (25) can be rewritten as:

$$V_{AR}(l) = -Nv \, 2\pi R \frac{d}{dl} \left( \frac{B_m A}{2\pi R} \right) \quad (26)$$

A can be extracted from equation (26) and expressed as:

$$A(l) = \frac{-1}{NvB_m} \int V_{AR}(L)dl + A_o \quad (27)$$

where $A_o$ is the value of $A(l)$ at $l=o$.

Equation (27) can be used to derive an expression for variations of the cross sectional area of the wire rope 28, as a function of length, which can be written as follows:

$$\Delta A(l) = \frac{1}{NvB_m} \int V_{AR}(l)dl \quad (28)$$

It follows from equation (28) that variations in the cross sectional area of the wire rope 28 can be measured by integrating the voltage induced in the saddle coil pair 34 and 40, which extend between the locations $l_3$ and $l_4$, as hereinbefore defined, and by making use of the magnetizing head disclosed in South African Patent No. 87/1964. This head magnetizes all parts of the wire rope in the manner shown in FIG. 2 as the rope passes axially through the head at a velocity $v$.

Equation (28) has been derived, as has been pointed out, for the ideal case in which the axial lengths of windings ED and GH are coincident with the axial lengths of windings NM and KJ respectively for, under these conditions, the voltages induced in these lengths cancel one another. However the voltage which is induced in the half circumferential winding BCD adds to the voltage induced in the half circumferential winding NPQ and similarly the voltage induced in the half circumferential winding EFG adds to the voltage induced in the half circumferential winding KLM. However the former pair of voltages is in opposition to the latter pair of voltages. This means that a pair of matched saddle coils, of the kind described, whose axial components of the windings are coincidental in space, are equivalent to two coils completely surrounding the rope, at the same locations, but which are connected in series opposition.

It is of course not possible to make the axial components of the windings of the coils exactly coincidental in space. FIGS. 5 to 7 illustrate different possibilities.

Referring firstly to FIG. 5 a gap g, which is as small as possible, exists between the axial components of the windings of the saddle coils. Not all of the radial flux between the locations $l_3$ and $l_4$ is measured but only a proportion, $$\frac{\pi R - g}{\pi R},$$

of it.

If $c << \pi R$ the correction factor which is to be applied to equation (28) is:

$$\left(1 + \frac{g}{\pi R}\right)$$

and equation (28) can be modified to read as follows:

$$\Delta A(l) = \left(1 + \frac{g}{\pi R}\right)\frac{1}{NvB_m} \int V_{AR}(l)dl \quad (29)$$

FIGS. 6 and 7 illustrate different approaches wherein the axial components of the windings of the saddle coils are offset so that, when viewed from the side, the components are coincident but, when viewed from the end, shown in the drawing, the components are displaced. In either case the total radial flux between the locations $l_3$ and $l_4$ is measured and no correction factor needs to be applied. However the construction of the coil former and the poles of the magnetic test head becomes more complicated.

It should be pointed out that the saddle coils need not be strictly semi-circular but may have any convenient shape provided the half circumferential windings are radially adjacent one another.

Another point to be borne in mind is that the preceding analysis has been carried out with reference to the locations $l_3$ and $l_4$. As is evident from equations (16) and (17) similar analyses can be carried out with reference to the locations $l_1$ and $l_2$, and $l_2$ and $l_3$, respectively.

Under experimental conditions pairs of saddle coils each of twenty-five turns were wound in appropriate slots in the coil former 26 of the magnetizing test head 14 shown in FIG. 2. For the locations $l_3$ and $l_4$ the flux densities were $B_m = 2.29$ tesla, and 0, respectively. A test rope 28 of 38 mm dia and with a cross sectional area of 719 mm$^2$ was used. This rope is shown in FIG. 8. An artificial step change in the area of 105,9 mm$^2$ and 600 mm long, was created in the test rope by adding wires 46 axially to the outer circumference of the test rope, as shown. The test rope 28 was approximately 30 meters long and was stretched between two anchor points with a force of 10 tonnes. The test head 14 was clamped around the rope and was moved axially along the rope at a constant velocity of up to 4 meters per second, by means of a pulley system.

Figure 10:
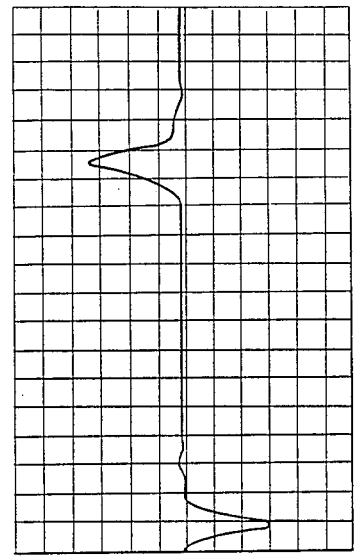

Use was made of a measuring system shown schematically in FIG. 9 which depicts the saddle coils 34 and 40 connected to one another as explained with reference to FIG. 3, an integrator 48, an amplifier 50 and a recorder 52. The inclusion of the amplifier is optional and depends on coil turns and the sensitivity of the recorder 52. The curve in FIG. 10 represents the output signal of the saddle coils and shows a first voltage spike at the beginning of the artificial area variation, and a second voltage spike at the end of the area variation and demonstrates the effectiveness of the principles embodied herein. It is to be noted that this curve was derived using the measuring locations which correspond to Equation 16. A similar curve is derived in respect of the locations which correspond to Equation 18.

Figure 11:
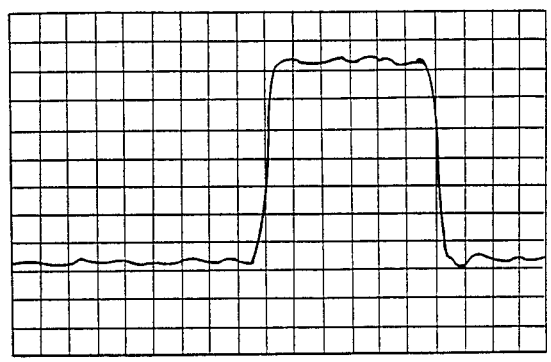
Figure 12:
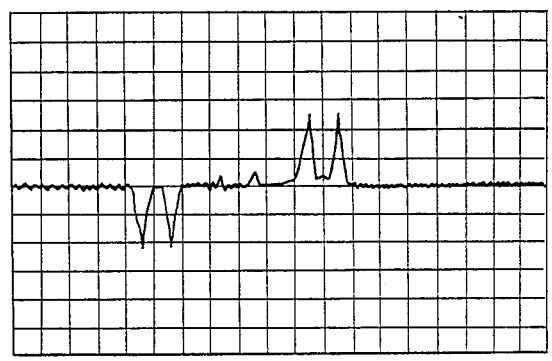
Figure 13:
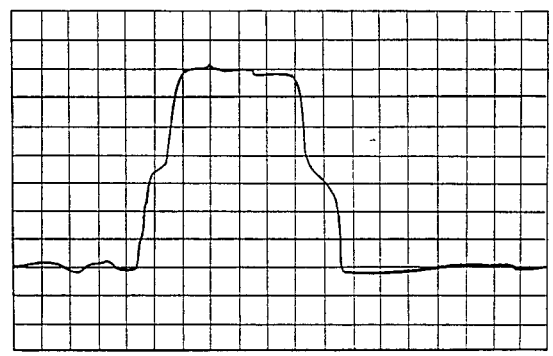

The curve shown in FIG. 11 was derived by using a digital integrator to integrate the output signal of the saddle coils for an area variation of 35 mm$^2$, for the previously mentioned rope, which represents 4.9% of the rope cross sectional area. This curve applies equally to the measuring locations associated with Equations 16 or 18. The curves of FIGS. 12 and 13 are based on the measuring locations associated with Equation 17. FIG. 12 illustrates spikes output by the saddle coils, and FIG. 13 the integral thereof, for a cross sectional area variation, in the rope, of 4.9%.

The use of the two saddle coils, which are constructed physically to be as similar as possible and which are ideally installed in accordance with the criteria mentioned hereinbefore, eliminates to a substantial extent the effects of noise or any other factor which has a common effect on both coils, for example stray flux which may pass through both coils. The output signal of the combined coils therefore, ideally, is representative of cross sectional area variations only. Nonetheless, despite all precautions, it is not possible to match the two coils so that signals induced in them are exactly balanced. The arrangement shown in FIG. 14 may be used to improve the balance between the coils. This Figure shows the two coils 34 and 40 connected to each other in parallel but with the connection point earthed. The terminals of the coils are connected across a resistor 54 with a variable tap 56. Adjustment of the tap about a null point can, in many cases, improve the signal to noise level of the output signal, which then represents cross sectional area variations in the rope more accurately.

Figure 14:
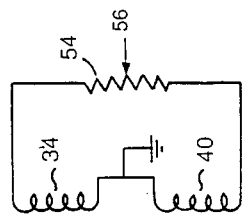
FIG. 14 shows a possible modification to be incorporated in the circuit of FIG. 9.
Figure 15:
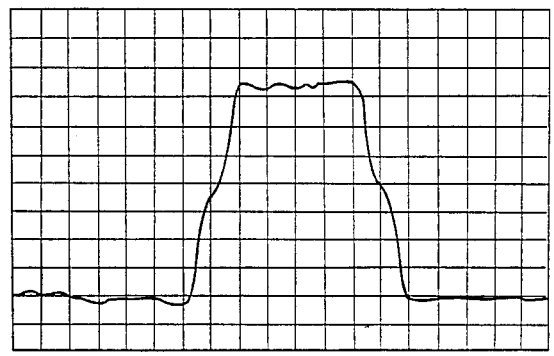
FIG. 15 illustrates another waveform.

The noise reduction circuit of FIG. 14 has a marked effect on the sensitivity of the apparatus of the invention. This is borne out by the curve of FIG. 15, which is based on Equation 17 and which therefore corresponds to the curve of FIG. 13, but obtained for an area variation of 10.6 mm$^2$ which is 1.5% of the rope cross sectional area.

Figure 16:
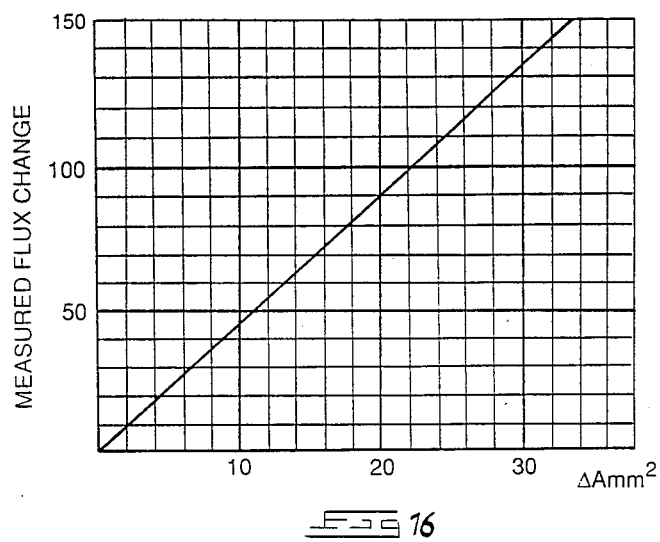
FIG. 16 is a graph of flux change as a function of area change.

The graph of FIG. 16 represents measured flux change as a function of $\Delta A$ (cross sectional area variation) for the aforementioned rope. Fractional area changes are clearly detectable and a linear relationship exists.

The invention has been described with reference to a wire rope. Clearly its principles are applicable to the testing of elongate objects such as cylinders, pipes, rods and the like.

I claim:

1. Apparatus for detecting cross-sectional variations in an elongate object which comprises a magnetizing head for establishing a first magnetic field and at least a second magnetic field which is adjacent the first magnetic field, means for forming a pathway which permits the elongate object to travel in an axial direction through the first magnetic field and through the second magnetic field so that the elongate object is magnetized in opposing axial directions by the first and second magnetic fields respectively, at least two saddle coils positioned opposite one another on opposing sides of the pathway, each saddle coil having at least first and second half circumferential windings which are positioned axially spaced from one another, the first half circumferential windings of the respective saddle coils being positioned at a location where the magnetic flux density in the object is at a maximum value and the second half circumferential windings being positioned at a location where the magnetic flux density in the object is zero, and means for detecting a voltage which is induced in the saddle coils.

2. Apparatus according to claim 1 wherein each saddle coil includes a plurality of turns.

3. Apparatus according to claim 1 wherein the saddle coils are connected across a bridge which is adjustable so as to compensate for noise which may be induced in the coils.

4. Apparatus according to claim 1 wherein the magnetizing head includes an inner pole of first polarity, two outer poles of a second polarity which is opposite to the first polarity, and permanent magnet stacks between the inner pole and each outer pole, respectively.

5. Apparatus according to claim 1 further including integrator means for integrating a voltage induced in the saddle coils with respect to time or to distance along a longitudinal axis of the elongate object.

6. Apparatus according to claim 1 wherein the forming means includes a former extending through the magnetizing head.

7. Apparatus according to claim 6 wherein the saddle coils are mounted to the former.

8. A method for detecting cross-sectional area variations in an elongate object comprising the steps of:
    positioning a magnetizing head so as to form a pathway for receipt of the elongate object
    introducing the elongate object into the magnetizing head by way of the pathway
    magnetizing the elongate object with the magnetizing head over at least two adjacent sections in opposing directions along a longitudinal axis of the elongate object
    positioning at least two saddle coils circumferentially about the magnetized adjacent sections of the elongate object so that the saddle coils are spaced apart along a longitudinal axis of the elongate object, the saddle coils each including at least first and second half circumferential windings
    detecting a radial magnetic flux associated with the elongate object
    locating the first half circumferential winding of a saddle coil at a position at which the magnetic flux density in the elongate object is at a maximum value and the second half circumferential winding of a saddle coil at a position at which the magnetic flux density in the elongate object is zero, and
    measuring variations in radial magnetic flux passing to or emanating from the elongate object as the object is moved longitudinally through the saddle coils.

9. A method according to claim 8, wherein the saddle coils are connected so as to be substantially insensitive to noise and so that a net voltage induced in the saddle coils may be detected.

* * * * *